(No Model.) 2 Sheets—Sheet 1.

W. J. STILL
ELECTRIC MOTOR.

No. 541,641. Patented June 25, 1895.

Witnesses. Inventor.

(No Model.) 2 Sheets—Sheet 2.

W. J. STILL.
ELECTRIC MOTOR.

No. 541,641. Patented June 25, 1895.

Witnesses.
W. J. Withrow.
E. R. Case

Inventor.
W. J. Still
by Fetherstonhaugh
& Co.

UNITED STATES PATENT OFFICE.

WILLIAM JOSEPH STILL, OF TORONTO, CANADA, ASSIGNOR TO CHARLES RIORDON, OF SAME PLACE.

ELECTRIC MOTOR.

SPECIFICATION forming part of Letters Patent No. 541,641, dated June 25, 1895.

Application filed August 9, 1894. Serial No. 519,904. (No model.)

*To all whom it may concern:*

Be it known that I, WILLIAM JOSEPH STILL, of the city of Toronto, in the county of York, in the Province of Ontario, Canada, have invented certain new and useful Improvements in Electric Motors, of which the following is a specification.

My invention relates to improvements in electric motors and the object of the invention is—first—to design a motor in which the eddy currents will be reduced to a minimum and the hysteresis completely done away with and—secondly—to provide a compact means for winding the armature in which there will be the least possible danger of short circuits, and it consists essentially—first—of constructing the core of the armature in cylindrical form with longitudinal recesses of substantially the width between the cores of the field magnets, the core—of the armature being loose on the shaft, and—maintained from revolving by the lines of force passing through the field magnets and core, and the armature being constructed in cylindrical form around but free from the core and supported on suitable disks and—secondly—of winding the armature with a series of wire loops with the sides of substantially arc-shaped bevel to fit the disks and the ends arranged to overtop each other, and substantially rectangular in form, one side of each loop passing across the field being arranged to come underneath one side of a corresponding loop, all the loops being arranged around the disks as hereinafter more particularly explained.

Figure 1:
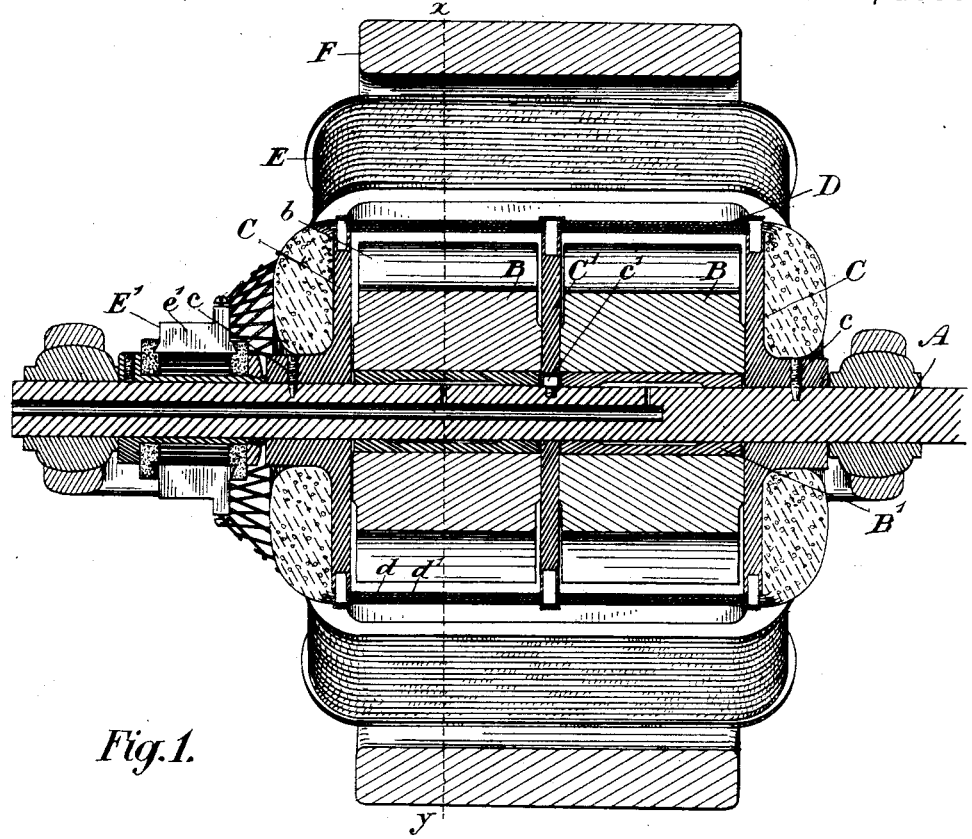
Figure 3:
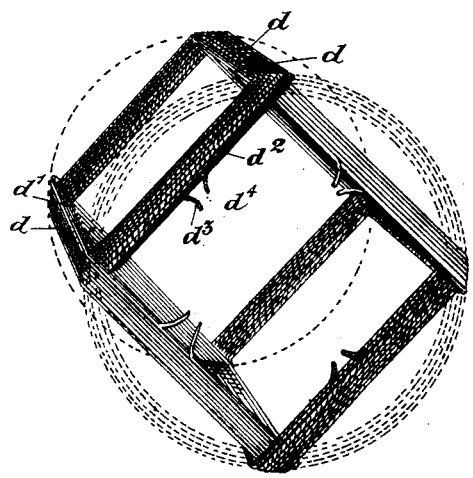
Figure 2:
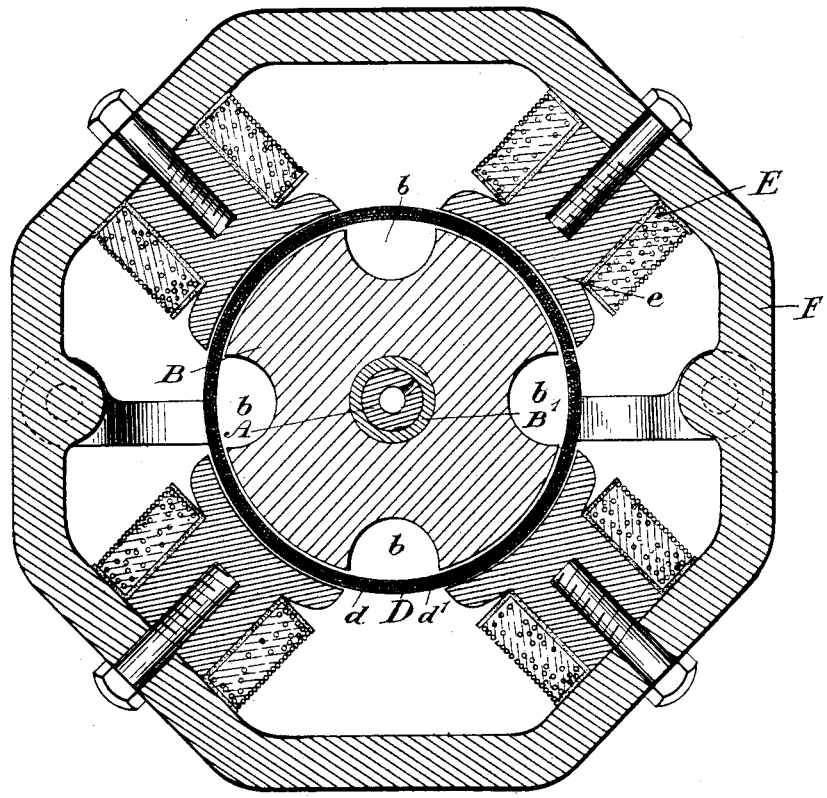

Figure 1 is a longitudinal section through my motor. Fig. 2 is a cross section through the line $x$ $y$, Fig. 1. Fig. 3 is a detail of the manner of winding the armature.

In the drawings like letters of reference indicate corresponding parts in each figure.

A is the main shaft of the motor, which is journaled in suitable bearings and B B is the core of the armature, which is made in two parts.

C are the end disks of the armature and C′ the central disk and D is the wire of the armature. The two parts of the core B are separated by the central disk C′ and are separated from the shaft A by a sleeve B′ of a non-magnetic metal such as brass.

The core B B has arc-shaped recesses $b$, the edges of which coincide in position with the edges of the cores $e$ of the field magnets E, which are suitably bolted to the frame F, thus forming an air gap in the core between the cores of the field magnets.

The end disks C, C, and central disk C′, are rigidly secured to the shaft by screws $c$ $c$ and $c'$. The wire D of the armature forms a complete circle around the core B, and is comprised of a series of substantially rectangular loops arranged around the periphery of the disks in the manner shown in Fig. 3, in which it will be noticed that the sides of the section of four loops are formed on an arc-shaped bevel to fit the disks perfectly. The sides $d$ of each loop fit over the opposite side $d'$ of a corresponding loop, and this is the arrangement around the complete periphery of the disks with the exception that the ends $d^2$ of the loops overtop or are piled on each other as indicated in Fig. 2. The two ends $d^3$ and $d^4$ of each coil lead to corresponding sections $e$ in the commutator E, which is suitably formed and insulated from the shaft.

It will be seen from the construction of motor above described that the lines of force passing from the field magnets to each other through the armature and core will necessarily take an inward course on account of the recesses $b$, and consequently there will be no fluctuation of the field at that portion of the armature between the field magnets, that is, the point opposite the recesses $b$ where the polarity is changed. The core, on account of the peculiar construction of the recesses $b$, will be prevented from revolving although the shaft will revolve within it thereby minimizing the eddy currents and absolutely dispensing with any hysteresis, which would result if the core of the armature revolved.

It will also be seen that sparking is absolutely prevented by having the recesses $b$, as a weak field is thereby maintained at the point of change of polarity.

The construction of my armature, it will be noticed from what has been before described, minimizes the danger to short circuits and is most compact.

What I claim as my invention is—

1. In an electric motor the combination with the exterior field magnets, of a hollow cylindrical armature comprised of wire loops suitably supported and secured on the main shaft of the motor, of a solid unwound core of magnetic metal located within the armature magnetically insulated from and loose on the shaft and provided with arc-shaped recesses in its periphery whereby it will always automatically assume a position with its longest axis in the direct path of the lines of force flowing from field to field and will maintain such position during the rotation of the shaft, as and for the purpose specified.

2. The combination with the exterior field magnets, of a hollow cylindrical armature supported on disks and comprised of a series of loops substantially rectangular arranged in sets abutting each other, the sides of the loops of each set being arc-shaped and each side being arranged to fit beneath the side of the adjacent loop of the set, so as to form a complete cylinder of double layer arc-shaped wire sides, the ends of the wire of each loop being connected to corresponding sections in the commutator, and a solid core loose on the shaft and magnetically insulated from it by a suitable sleeve and provided with recesses located between the cores of the field magnets, as and for the purpose specified.

3. In a motor of the class described a hollow cylindrical armature comprised of a series of substantially rectangular wire loops arranged in sets, the side of each loop of each set fitting under the corresponding side of the next adjacent loop of the set so as to form a complete cylinder of double layer arc-shaped sides, the ends of the loops being arranged to overtop each other, and the ends of the wires of each loop being connected to a corresponding section of the commutator, as and for the purpose specified.

WILLIAM JOSEPH STILL.

Witnesses:
  B. BOYD,
  E. R. CASE.